United States Patent
Park et al.

(10) Patent No.: US 11,921,546 B2
(45) Date of Patent: Mar. 5, 2024

(54) POLYIMIDE FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Jin Su Park, Daejeon (KR); Hye Ri Kim, Daejeon (KR); Jin Hyung Park, Daejeon (KR); Yoo Seock Hwang, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 184 days.

(21) Appl. No.: 17/244,033

(22) Filed: Apr. 29, 2021

(65) Prior Publication Data

US 2021/0341971 A1    Nov. 4, 2021

(30) Foreign Application Priority Data

May 4, 2020 (KR) .................. 10-2020-0053212

(51) Int. Cl.
| | |
|---|---|
| *G06F 1/16* | (2006.01) |
| *B32B 27/28* | (2006.01) |
| *C08G 73/14* | (2006.01) |
| *G02B 1/04* | (2006.01) |
| *G02B 1/14* | (2015.01) |

(52) U.S. Cl.
CPC .......... *G06F 1/1652* (2013.01); *B32B 27/281* (2013.01); *C08G 73/14* (2013.01); *G02B 1/04* (2013.01); *G02B 1/14* (2015.01); *B32B 2307/51* (2013.01); *B32B 2457/206* (2013.01); *B32B 2457/208* (2013.01); *C09K 2323/03* (2020.08)

(58) Field of Classification Search
CPC ............ C08G 73/14; C08G 73/1039; C08G 73/1042; C08G 73/1075; C08G 69/42; C08J 2379/08; B32B 27/281; C09K 2323/03

See application file for complete search history.

(56) References Cited

U.S. PATENT DOCUMENTS

| | | | |
|---|---|---|---|
| 10,189,949 B2 | 1/2019 | Takiue | |
| 10,738,173 B2 | 8/2020 | Chae et al. | |
| 2011/0124806 A1 | 5/2011 | Simmons et al. | |
| 2011/0178266 A1 | 7/2011 | Cho et al. | |
| 2016/0319076 A1 | 11/2016 | Ju et al. | |
| 2017/0342224 A1* | 11/2017 | Chae ................. | G09F 9/301 |
| 2018/0044476 A1* | 2/2018 | Park ................. | C08G 73/1021 |
| 2019/0077917 A1* | 3/2019 | Jeong ............... | G02B 1/14 |

FOREIGN PATENT DOCUMENTS

| | | | | |
|---|---|---|---|---|
| EP | 3088440 A1 | | 11/2016 | |
| JP | 2008255175 A | * | 10/2008 | |
| JP | 2019137864 A | | 8/2019 | |
| KR | 1020120102712 A | | 9/2012 | |
| KR | 101293346 B1 | | 8/2013 | |
| KR | 1020150138032 A | | 12/2015 | |
| KR | 1020160032181 A | | 3/2016 | |
| KR | 1020170028083 A | | 3/2017 | |
| KR | 1020170132499 A | | 12/2017 | |
| KR | 1020180018307 A | | 2/2018 | |
| KR | 101839293 B1 | | 3/2018 | |
| KR | 1020180047285 A | | 5/2018 | |
| KR | 1020200042222 A | | 4/2020 | |
| KR | 102286207 B1 | * | 9/2021 | ............ G09F 9/301 |
| WO | 2018135432 A1 | | 7/2018 | |
| WO | 2020242242 A1 | | 12/2020 | |

* cited by examiner

*Primary Examiner* — Sophie Hon
(74) *Attorney, Agent, or Firm* — The Webb Law Firm

(57) ABSTRACT

The present invention relates to a polyimide-based film, a window cover film including the polyimide-based film, and a display panel including the polyimide-based film. More specifically, the present invention relates to a polyimide-based film of which a modulus measured according to ASTM D882 is 5 GPa or more and a rate of change of the modulus, after the polyimide-based film is maintained under a high-temperature and high-humidity condition of 60° C. and 90% RH for 500 hours, is 10% or less.

12 Claims, No Drawings

POLYIMIDE FILM AND FLEXIBLE DISPLAY PANEL INCLUDING THE SAME

CROSS-REFERENCE TO RELATED APPLICATION

This application claims priority to Korean Patent Application No. 10-2020-0053212 filed May 4, 2020, the disclosure of which is hereby incorporated by reference in its entirety.

BACKGROUND OF THE INVENTION

Field of the Invention

The following disclosure relates to a polyimide-based film, a window cover film including the polyimide-based film, and a display panel including the polyimide-based film.

More particularly, the following disclosure relates to a polyimide-based film that is less deformed and has small changes in optical physical properties even in a case where water permeates in a high-temperature and high-humidity environment, and a window cover film including the polyimide-based film, and a display panel including the polyimide-based film.

Description of Related Art

A thin type display device is implemented in a touch screen panel type, and has been used in various smart devices such as a smart phone, a tablet PC, and various wearable devices.

Such a display device using a touch screen panel is provided with a window cover including tempered glass or a plastic film on a display panel for protecting the display panel from a scratch or external impact. However, the tempered glass is not suitable for lightness and is vulnerable to external impact, and polyethylene terephthalate (PET), polyethersulfone (PES), polyethylene naphthalate (PEN), polyacrylate (PAR), polycarbonate (PC), polyimide (PI), polyaramid (PA), or the like is used for the plastic film, but the plastic film is more vulnerable to water under a high-temperature and high-humidity condition than glass. When a water content is increased under the high-temperature and high-humidity condition, problems such as a reduction in mechanical strength such as a modulus, occurrence of a curl, deterioration of a mura phenomenon, a change in phase difference characteristics, and the like become more serious.

In particular, a polyimide-based film, which has recently been in the spotlight, has hydrophilic properties, and thus, the above problems occur more seriously in the polyimide-based film in the high-temperature and high-humidity environment. In addition, the polyimide-based film has poor durability when being used.

Therefore, a demand for a polyimide-based film having small changes in mechanical physical properties and optical physical properties even under a high-temperature and high-temperature condition has increased.

RELATED ART DOCUMENT

[Patent Document]
(Patent Document 1) Korean Patent Laid-Open Publication No. 10-2017-0028083 A (Mar. 13, 2017)

SUMMARY OF THE INVENTION

An embodiment of the present invention is directed to providing a polyimide-based film that is not deformed and has small changes in optical physical properties under a severe condition of high-temperature and high-humidity.

Another embodiment of the present invention is directed to providing a polyimide-based film having stable optical physical properties because the polyimide-based film has a small change in modulus, is less curled, and has a small change in phase difference characteristics even in a case where water permeates under a severe condition of high-temperature and high-humidity, a window cover film including the polyimide-based film, and a flexible display panel including the polyimide-based film.

In one general aspect, there is provided a polyimide-based film of which a modulus measured according to ASTM D882 is 5 GPa or more and a rate of change of the modulus, after the polyimide-based film is maintained under a high-temperature and high-humidity condition of 60° C. and 90% RH for 500 hours, is 10% or less.

The present invention may provide a polyimide-based film of which a rate of change of a modulus, after the polyimide-based film is maintained under a high-temperature and high-humidity condition of 60° C. and 90% RH for 500 hours, is 10% or less, the rate of change of the modulus being obtained by performing heat treatment on the polyimide-based film in which a content of a solvent is 5 wt % or less using hot air containing a humidity of 1 to 10 wt %.

A rate of change of an in-plane phase difference of the polyimide-based film, after the polyimide-based film is maintained under the high-temperature and high-humidity condition of 60° C. and 90% RH for 500 hours, may be 5% or less.

An in-plane phase difference and a phase difference in a thickness direction of the polyimide-based film measured at a wavelength of 550 nm may be 200 nm or less and 6,000 nm or less, respectively. The polyimide-based film may have an elongation at break of 8% or more when measured according to ASTM D882, a light transmittance of 5% or more when measured at 388 nm according to ASTM D1746, a total light transmittance of 87% or more when measured at 400 to 700 nm according to ASTM D1746, a haze of 2.0% or less, a yellow index of 5.0 or less, and a value of 2.0 or less.

The present invention may provide a window cover film for a display device including the polyimide-based film having the above physical properties and a display device including the same.

The window cover film may further include one or more coating layers selected from a hard coating layer, an anti-static layer, an anti-fingerprint layer, an anti-fouling layer, an anti-scratch layer, a low-refractive layer, an anti-reflective layer, and an impact absorption layer, the coating layer being formed on one surface of the polyimide-based film.

A method of producing the polyimide-based film according to the present invention is not particularly limited as long as the above physical properties are obtained. As an example of a method of obtaining the physical properties of the present invention, a polyimide-based film in which a content of a solvent is maintained within 5 wt % and preferably within 3 wt % may be formed, and then the polyimide-based film may be additionally subjected to heat treatment using hot air containing a humidity of 1 to 10 wt %, thereby completing the present invention. However, the present invention is not limited to the above method as long as the physical properties of the present invention may be obtained.

In the present invention, a temperature in the heat treatment is not particularly limited as long as the characteristics of the present invention are exhibited. However, it is recognized that the characteristics of the present invention may be achieved by preferably performing the heat treatment within a range between a temperature lower than a glass transition temperature of the polyimide-based film by 10° C. and a temperature lower than the glass transition temperature of the polyimide-based film by 100° C., thereby completing the present invention.

Other features and aspects will be apparent from the following detailed description, the drawings, and the claims.

DESCRIPTION OF THE INVENTION

Hereinafter, the present invention will be described in detail. However, each of the following exemplary embodiments is merely one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention pertains.

The terms used in the description of the present invention are merely used to effectively describe a specific exemplary embodiment, but are not intended to limit the present invention.

In addition, unless the context clearly indicates otherwise, the singular forms used in the specification and appended claims are intended to include the plural forms.

In addition, unless explicitly described to the contrary, "comprising" any components will be understood to imply further inclusion of other components rather than the exclusion of any other components.

The term "polyimide-based resin" in the present invention includes a polyimide resin and a polyamide-imide resin. The term "polyimide-based film" is also the same as described above.

In the present invention, the meaning of a "polyamic acid solution" is the same as a "polyamic acid resin composition".

In the present invention, the meaning of a "polyimide-based resin solution" is the same as a "composition for forming a polyimide-based film" and a "polyamide-imide solution". In addition, the polyimide-based resin solution may include a polyimide-based resin and a solvent in order to form a polyimide-based film.

The term "film" in the present invention may be obtained by applying a "polyimide-based resin solution" onto a substrate, drying the polyimide-based resin solution to obtain a film, and then peeling off the film, and the film may be stretched or not stretched.

The terms "curl" and "curling" in the present invention refer to bending-deformation of a film. The term "degree of curl" may refer to a vertical height from the lowest point of the film to a point where the film is bent and raised when a curled film is disposed on a plane.

The term "curl suppression property" used in the present specification may refer to a property in which the "degree of curl" is small.

As a result of conducting intensive studies to provide a film that is less curled and has small changes in mechanical physical properties and optical physical properties under a high-temperature and high-humidity condition, the present inventors found a polyimide-based film having a more excellent modulus and a significantly reduced change amount of the modulus even under the high-temperature and high-humidity condition, and a method of producing the same, thereby completing the present invention.

An exemplary embodiment of the present invention provides a polyimide-based film of which a modulus measured according to ASTM D882 is 5 GPa or more and a rate of change of the modulus, after the polyimide-based film is maintained under a high-temperature and high-humidity condition of 60° C. and 90% RH for 500 hours, is 10% or less.

Further, an exemplary embodiment of the present invention provides a polyimide-based film of which a modulus measured according to ASTM D882 is 5 GPa or more and a rate of change of an in-plane phase difference, after the polyimide-based film is maintained under a high-temperature and high-humidity condition of 60° C. and 90% RH for 500 hours, is 5% or less.

Further, an exemplary embodiment of the present invention provides a polyimide-based film of which a modulus measured according to ASTM D882 is 5 GPa or more, a rate of change of the modulus, after the polyimide-based film is maintained under a high-temperature and high-humidity condition of 60° C. and 90% RH for 500 hours, is 10% or less, and a rate of change of an in-plane phase difference measured in the same condition is 5% or less.

Further, the present invention provides a polyimide-based film of which a modulus measured according to ASTM D882 is 5 GPa or more and a rate of change of the modulus, after the polyimide-based film is maintained under a high-temperature and high-humidity condition of 60° C. and 90% RH for 500 hours, is 10% or less, wherein occurrence of a curl is suppressed and changes in mechanical physical properties and optical physical properties are small even after the polyimide-based film is maintained under the high-temperature and high-humidity condition of 60° C. and 90% RH for 500 hours.

The polyimide-based film according to the present invention may be obtained by various methods, for example, a structure change of polyimide, a composition change, drying, stretching, and heat treatment methods, adjustment of a residual amount of a solvent in a film before being subjected to heat treatment, or a combination thereof. Any method may be used as long as a film obtained by the method satisfies physical properties of the present invention.

As a non-limiting example of a method of producing the polyimide-based film according to the present invention, a polyimide-based film may be produced by forming a film having a residual amount of a solvent of 5 wt % or less after film formation when performing casting using a polyimide solution and additionally performing heat treatment on the formed polyimide-based film in which a content of the solvent is maintained within 5 wt % and preferably within 3 wt % using hot air containing a humidity of 1 to 10 wt %. Therefore, the present invention may be achieved. The range of 1 to 10 wt % refers to a range in which a content of water in air to be supplied during the high-temperature heat treatment is 1 to 10 wt %, and is calculated as a relative humidity measured before the air to be supplied during the heat treatment passes through a heater.

In the present invention, a temperature in the heat treatment is not particularly limited as long as the characteristics of the present invention are exhibited. However, it is recognized that the characteristics of the present invention may be achieved by performing the heat treatment within a range between a temperature lower than a glass transition temperature of a polyimide resin by 10° C. and a temperature lower than the glass transition temperature of the polyimide resin by 100° C. and more preferably within a range between a temperature lower than the glass transition temperature of the polyimide resin by 30° C. and a temperature lower than the glass transition temperature of the polyimide resin by 100° C.

Since the temperature range in the heat treatment may vary depending on the glass transition temperature of the polyimide resin, the temperature range in the heat treatment is not specified. However, when a polyimide resin having a glass transition temperature of 320° C. is used, the heat treatment may be performed at 220 to 310° C. and more preferably 220 to 290° C.

In addition, the polyimide-based film according to the present invention may have a modulus of 5 GPa or more, 6 GPa or more, or 7 GPa or more when measured according to ASTM D882, an elongation at break of 8% or more, 12% or more, or 15% or more when measured according to ASTM D882, a light transmittance of 5% or more or 5 to 80% when measured at 388 nm according to ASTM D1746, a total light transmittance of 87% or more, 88% or more, or 89% or more when measured at 400 to 700 nm according to ASTM D1746, a haze of 2.0% or less, 1.5% or less, or 1.0% or less when measured according to ASTM D1003, a yellow index of 5.0 or less, 3.0 or less, or 0.4 to 3.0 when measured according to ASTM E313, and a value of 2.0 or less, 1.3 or less, or 0.4 to 1.3 when measured according to ASTM E313.

In an exemplary embodiment of the present invention, a thickness of the polyimide-based film may be 10 to 500 µm, 20 to 250 µm, or 30 to 100 µm.

In an exemplary embodiment of the present invention, the polyimide-based film is formed of a polyimide-based resin, and in particular, is formed of a polyimide-based resin having a polyamide-imide structure.

In addition, the polyimide-based film may be more preferably formed of a polyamide-imide-based resin having a fluorine atom and an aliphatic cyclic structure, and thus, the polyimide-based film may have excellent mechanical physical properties and dynamic bending properties.

In an exemplary embodiment of the present invention, the polyamide-imide-based resin having a fluorine atom and an aliphatic cyclic structure may have a unit derived from a fluorine-based aromatic diamine, a unit derived from an aromatic dianhydride, and a unit derived from an aromatic diacid dichloride.

More preferably, in an exemplary embodiment of the present invention, in a case where the polyamide-imide-based resin having a fluorine atom and an aliphatic cyclic structure is obtained by using a copolymer having a unit derived from a fluorine-based aromatic diamine, a unit derived from an aromatic dianhydride, a unit derived from an alicyclic dianhydride, and a unit derived from an aromatic diacid dichloride, the desired physical properties may be obtained, which may be preferable.

In addition, in the present invention, in a case where a polyamide-imide-based polymer having a fluorine-substituted polyamide block and an alicyclic structure is used, more excellent mechanical physical properties may be provided, which may be preferable.

In an exemplary embodiment of the present invention, as an example of the polyamide-imide-based resin having a fluorine atom and an aliphatic cyclic structure, in a case where an amine-terminated polyamide oligomer derived from a first fluorine-based aromatic diamine and an aromatic diacid dichloride is produced, and a polyimide polymer is produced by polymerizing the amine-terminated polyamide oligomer and monomers derived from a second fluorine-based aromatic diamine, an aromatic dianhydride, and an alicyclic dianhydride, the object of the present invention is better achieved, which is preferable. The types of the first fluorine-based aromatic diamine and the second fluorine-based aromatic diamine may be the same as or different from each other.

More specifically, the polyimide-based resin according to an exemplary embodiment may have a block consisting of an amine-terminated polyamide oligomer derived from a first fluorine-based aromatic diamine and an aromatic diacid dichloride and a polyimide unit at each of both ends thereof, and a content of the block may be 50% or more based on mass.

In an exemplary embodiment of the present invention, in a case where an amine-terminated oligomer in which an amide structure is formed in a polymer chain by the aromatic diacid dichloride is included, the optical physical properties may be improved, and in particular, a mechanical strength such as a modulus may also be improved. Also, dynamic bending properties may be further improved, which may also be preferable.

In an exemplary embodiment of the present invention, when the resin has a polyamide oligomer block as described above, a molar ratio of the diamine monomer including the amine-terminated polyamide oligomer and the second fluorine-based aromatic diamine to the dianhydride monomer including the aromatic dianhydride and the alicyclic dianhydride may be 1:0.9 to 1.1, and more preferably 1:1.

In addition, a content of the amine-terminated polyamide oligomer with respect to the entire diamine monomer is not particularly limited, but may be 30 mol % or more, preferably 50 mol % or more, and more preferably 70 mol % or more, in terms of satisfying the mechanical physical properties, the yellow index, and the optical properties of the present invention. In addition, when a polyamide-imide film having a difference in surface energy according to the present invention is provided, selectivity of a coating solvent may be increased by a variety of solubilities.

In addition, a composition ratio of the aromatic dianhydride to the alicyclic dianhydride is not particularly limited, but is preferably 30 to 80 mol %:70 to 20 mol %, in consideration of achieving the transparency, the yellow index, and the mechanical physical properties of the present invention, but the present invention is not limited thereto.

In addition, the polyamide-imide-based resin having a fluorine atom and an aliphatic cyclic structure may be a polyamide-imide-based resin obtained by mixing, polymerizing, and imidizing a fluorine-based aromatic diamine, an aromatic dianhydride, an alicyclic dianhydride, and an aromatic diacid dichloride.

Such a resin has a random copolymer structure. A content of the aromatic diacid dichloride may be 40 moles or more, and preferably 50 to 80 moles with respect to 100 moles of the diamine. A content of the aromatic dianhydride may be 10 to 50 moles with respect to 100 moles of the diamine. A content of the alicyclic dianhydride may be 10 to 60 moles with respect to 100 moles of the diamine. The polyamide-imide-based resin may be produced by a polymerization in which a molar ratio of the sum of the diacid dichloride and the dianhydride to the diamine monomer is 1:0.9 to 1.1, and more preferably 1:1.

The random polyamide-imide according to the present invention is slightly different in solvent sensitivity from that of the block polyamide-imide resin due to the optical properties such as transparency, the mechanical physical properties, and the difference in surface energy, but may also fall within the scope of the present invention.

In an exemplary embodiment of the present invention, as the fluorine-based aromatic diamine component, a mixture of 2,2'-bis(trifluoromethyl)-benzidine and another known aromatic diamine component may be used, but 2,2'-bis (trifluoromethyl)-benzidine may be used alone. By using such a fluorine-based aromatic diamine, the optical properties and the yellow index of the polyamide-imide-based film may be improved based on the mechanical physical properties required in the present invention. In addition, a tensile modulus of the polyamide-imide-based film may be improved, and thus a mechanical strength of a hard coating layer may be improved and dynamic bending properties of the hard coating layer may be further improved.

The aromatic dianhydride may be one or a mixture of two or more of 4,4'-hexafluoroisopropylidene diphthalic anhydride (6FDA), biphenyltetracarboxylic dianhydride (BPDA), 4,4'-oxydiphthalic dianhydride (ODPA), sulfonyl diphthalic anhydride ($SO_2DPA$), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In an exemplary embodiment of the present invention, in the case where the amide structure is formed in the polymer chain by the aromatic diacid dichloride, the optical physical properties, and in particular, the mechanical strength such as a modulus may be greatly improved, and the dynamic bending properties may be further improved, which may be preferable.

The aromatic diacid dichloride may be one or a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

In the present invention, a weight average molecular weight of the polyimide resin is not particularly limited, but may be 200,000 g/mol or more, preferably 300,000 g/mol or more, and more preferably 200,000 to 500,000 g/mol. In addition, a glass transition temperature of the polyimide resin is not limited, but may be 300 to 400° C., and more specifically, 330 to 380° C. Within the above range, a film having a high modulus, excellent mechanical strength, excellent optical physical properties, and a small degree of curl may be provided, which is preferable, but the present invention is not particularly limited thereto.

Hereinafter, a method of producing the polyimide-based film will be described.

In an exemplary embodiment of the present invention, the polyimide-based film may be produced by a solution casting method of applying a "polyimide-based resin solution" including a polyimide-based resin and a solvent onto a substrate and performing drying or drying and stretching, or heat treatment.

Hereinafter, an example of producing the polyimide-based film according to the present invention will be described, but a method thereof is not limited as long as a polyimide-based film having the characteristics of the present invention may be obtained.

A film formation step according to the present invention is a step of obtaining a polyimide solution by dissolving a polyimide resin in a solvent and applying the polyimide solution onto a substrate. The solvent according to the present invention is not particularly limited as long as it is a non-reactive solvent which dissolves polyimide, and examples thereof may include various solvents, for example, amide-based solvents such as N,N-dimethylacetamide (DMAc), dimethylformamide, pyrrolidone, and tetrahydrofuran, an ether, an ester, and an alcohol, but the present invention is not limited thereto. More specifically, dimethylacetamide (DMAc), N-methyl-2-pyrrolidone (NMP), dimethylformamide (DMF), dimethyl sulfoxide (DMSO), acetone, ethyl acetate, or m-cresol may be used as the solvent, but the present invention is not limited thereto.

That is, the polyimide-based film may be produced by applying the polyimide solution on a substrate and drying the polyimide solution in a drying step divided into a drying region or additionally performing a stretching step after or before the drying step. Alternatively, the polyimide-based film may be produced by additionally performing a heat treatment step after the drying step and/or the stretching step.

The substrate on which the solution is casted is not particularly limited, but for example, glass, stainless steel, or another substrate film may be used as a substrate. However, the present invention is not limited thereto. The polyamide-imide according to the present invention may be applied onto the substrate layer by a die coating method, an air knife coating method, a reverse roll coating method, a spray coating method, a blade coating method, a casting coating method, a gravure coating method, a spin coating method, or the like. However, in general, the solution coating method may be used without limitation. Specifically, as the application, one or more methods selected from a spin coating method, a dip-coating method, a spray coating method, a die coating method, a bar coating method, a roll coating method, a meniscus coating method, a flexo printing method, a screen printing method, a bead coating method, an air knife coating method, a reverse roll coating method, a blade coating method, a casting coating method, and a gravure coating method may be used, but the present invention is not limited thereto.

The drying condition in the present invention is not particularly limited as long as a film containing 5% or less of a solvent may be obtained, but the heat treatment may be performed stepwise at 80 to 100° C. for 1 to 2 hours, 100 to 200° C. for 1 to 2 hours, and 250 to 300° C. for 1 to 2 hours.

After the heat treatment, the film is peeled off in a range in which a content of a residual solvent in the film is 5 wt % or less and more preferably 3 wt % or less, and the peeled film is subjected to heat treatment using hot air containing a humidity of 1 to 10 wt %.

The heat treatment time or the heat treatment temperature in the heat treatment step is not particularly limited as long as a film satisfying the characteristics of the present invention is obtained, but, for example, when the heat treatment is performed within a range between a temperature lower than a glass transition temperature of the polyimide-based film by 10° C. and a temperature lower than the glass transition temperature of the polyimide-based film by 100° C. for 1 minute to 1 hour and more preferably 5 minutes to 30 minutes, the desired physical properties of the present invention may be obtained.

That is, it is recognized that a film having excellent physical properties such as a rate of change of the modulus of 10% or less and/or a rate of change of the in-plane phase difference of 5% or less may be obtained even in a severe environment of high-temperature and high-humidity (60° C., 90% RH, 500 hr). Since the film has such physical properties, a curl does not occur even during long-term use under a high-temperature and high-humidity condition, a mura phenomenon does not occur, and excellent mechanical physical properties and optical physical properties may be maintained.

In addition, the produced film according to the present invention may satisfy physical properties in which an in-plane phase difference ($R_{in}$) and a phase difference in a thickness direction ($R_{th}$) of the film measured at a wavelength of 550 nm using an Axoscan (OPMF, Axometrics Inc.) are 200 nm or less and 6,000 nm or less, respectively. In addition, the produced film according to the present invention may satisfy physical properties in which a uniformity of each of the in-plane phase difference ($R_{in}$) and the phase difference in the thickness direction ($R_{th}$) measured at a wavelength of 550 nm over the entire area of the film is 5% or less. That is, the produced film according to the present invention may satisfy physical properties in which a difference between a maximum value and a minimum value of the in-plane phase difference and a difference between a maximum value and a minimum value of the phase difference in the thickness direction at a plurality of arbitrary points in the entire area of the film are 5% or less.

In addition, a rate of change of the in-plane phase difference of the polyimide-based film, after the polyimide-based film is maintained under a high-temperature and high-humidity condition of 60° C. and 90% RH for 500 hours, may be 5% or less and more preferably 4% or less.

That is, in the polyimide-based film according to the present invention, and more specifically, in the polyamide-imide-based film, the changes in modulus and phase difference characteristics are small even in a severe environment of a high-temperature and high-humidity (60° C., 90% RH, 500 hr). Therefore, a polyimide-based film having high durability for a window cover film of a flexible display panel may be provided.

In addition, a deviation in mechanical strength in a machine direction (MD) is reduced, such that occurrence of a curl may be suppressed even in a severe environment. Specifically, after the film is maintained under a high-temperature and high-humidity condition, a degree of curl of the film may be 5 mm or less, preferably 4 mm or less, more preferably 3 mm or less, and still more preferably 0 to 2 mm. The degree of curl refers to a vertical height from the lowest point (for example, the center) at which the film is stretched downward to a vertex of a sample on a plane obtained by connecting vertices of the sample which is inclined at an angle of 45° in the MD and cut into a square with 15 cm sides. The curl of the sample inclined at the angle of 45° in the MD is measured, such that the curl at each vertex means a curl in the MD and a direction vertical to the MD. Therefore, the curl in each direction may be determined.

<Window Cover Film>

Another exemplary embodiment of the present invention provides a window cover film including the polyimide-based film and a coating layer formed on the polyimide-based film.

The coating layer, which is a layer for imparting functionability to the window cover film, may be applied in various forms depending on a purpose. As a specific example, the coating layer may include one or more layers selected from a hard coating layer, a restoration layer, an impact spread layer, a self-cleaning layer, an anti-fingerprint layer, an anti-scratch layer, a low-refractive layer, and an impact absorption layer, but the present invention is not limited thereto.

<Display Device>

Still another exemplary embodiment of the present invention provides a display device including a display panel and the window cover film formed on the display panel.

In an exemplary embodiment of the present invention, the display device is not particularly limited as long as it belongs to a field requiring excellent optical properties, and may be provided by selecting a display panel appropriate therefor. Preferably, the window cover film may be applied to a flexible display device. As a specific example, the window cover film may be included in and applied to one or more image display devices selected from various image display devices such as a liquid crystal display device, an electroluminescence display device, a plasma display device, and a field emission display device, but the present invention is not limited thereto.

Hereinafter, the present invention will be described in more detail on the basis of Examples and Comparative Examples. However, the following Examples and Comparative Examples are only examples for describing the present invention in more detail, and the present invention is not limited by the Examples and Comparative Examples.

1) Modulus/Elongation at Break

A modulus and an elongation at break of a polyamide-imide film were measured under a condition in which the polyamide-imide film having a length of 50 mm and a width of 10 mm was pulled according to ASTM D882 at 25° C. and 50 mm/min using a UTM 3365 (manufactured by Instron Corporation).

A thickness of the film was measured, and data of a value thereof was input to the device. A unit of the modulus is GPa, and a unit of the elongation at break is %

2) Light Transmittance

For the film having a thickness of 50 μm, a total light transmittance measured in the entire wavelength region of 400 to 700 nm and a single wavelength light transmittance measured at 388 nm were measured according to the ASTM D1746 standard using a spectrophotometer (COH-400, Nippon Denshoku Industries Co., Ltd.) and a UV/Vis (UV3600, Shimadzu Corporation), respectively. A unit of the light transmittance is %

3) Haze

A haze of the film having a thickness of 50 μm was measured according to the ASTM D1003 standard using the spectrophotometer (COH-400, Nippon Denshoku Industries Co., Ltd.). A unit of the haze is %.

4) Yellow Index (YI) and b* Value

A yellow index and a b* value of the film having a thickness of 50 μm were measured according to the ASTM E313 standard using a colorimeter (ColorQuest XE, Hunter Associates Laboratory, Inc.).

5) Weight Average Molecular Weight (Mw) and Polydispersity Index (PDI)

A weight average molecular weight and a polydispersity index of the produced film were measured as follows.

First, a film sample dissolved in a DMAc eluent containing 0.05 M LiBr was used as a sample.

The measurement was performed using GPC (Waters GPC system, Waters 1515 isocratic HPLC Pump, Waters 2414 Refractive Index detector), an Olexis, a Polypore, and a mixed D column were connected to each other and used as a GPC Column, a DMAc solution was used as a solvent, polymethyl methacrylate (PMMA STD) was used as a standard material, and the analysis was performed at 35° C. and a flow rate of 1 mL/min.

6) Pencil Hardness 20 mm of a line was drawn on a film produced in each of Examples and Comparative Examples according to JIS K5400 at a load of 750 g and a rate of 50 mm/sec, and the drawing of the line was repeated 5 times or more, to measure a pencil hardness when scratches were generated one or fewer times.

7) Measurement of Content of Residual Solvent

A content of a residual solvent was measured by determining, as a residual solvent in the film, a value obtained by subtracting a weight of the film at 370° C. from a weight of the film at 150° C. by using a TGA (TA Instruments, Discovery). In this case, a change in weight in a range of 150 to 370° C. was measured under a measurement condition in which a temperature was raised to 400° C. at a temperature rise rate of 10° C./min.

8) Measurement of Phase Difference

Phase difference characteristics were measured using an Axoscan (OPMF, Axometrics Inc.). A sample having an appropriate size was placed onto a stage to measure an in-plane phase difference ($R_{in}$) at a wavelength of 550 nm. In measurement of a phase difference in a thickness direction ($R_{th}$), values of $R_{in}$ and $R_{th}$ calculated by software based on a phase difference with respect to a tilt angle (0 to 45°) were measured using two axes including a slow axis and a fast axis of a sample as a rotational axis.

9) Measurement of Degree of Curl

A film was cut into a square having a size of 15 cm×15 cm in a direction inclined in a machine direction (MD) by 45°. That is, two vertices were directed in the MD and the remaining two vertices were directed in a transverse direction (TD). The cut film was left under a constant temperature and humidity condition of 25±3° C. and 55±5% RH for 12 hours, a vertical height (unit: mm) from the lowest point (for example, the center) of the film to the vertex on a plane obtained by connecting vertices was measured, and a maximum value was used as a degree of curl (mm).

10) Observation of Mura Phenomenon

White light was turned on using an I-Phone X (Apple Inc.) and a mura phenomenon according to each viewing angle was observed in a state where the produced polyimide-based film was laminated on an upper portion. Five people were selected and the mura phenomenon was observed in the same darkroom. A case where five people determined that it was good was evaluated as good (○), a case where fewer than four people determined that it was good was evaluated as slightly bad (Δ), and a case where fewer than three people determined that it was good was evaluated as bad (×).

11) Measurement of Glass Transition Temperature

A glass transition temperature was measured according to ASTM E1640 using a dynamic mechanical analyzer (DMA, SDTA 861e, Mettler Toledo). A film having a size of 9×2 mm² was prepared as a sample, and a frequency was measured as 1 Hz at a temperature of 30 to 400° C., a temperature rise rate of 5° C./min, and a load of 0.1 N.

The film was prepared in a size of 9×2 mm² and the sample was loaded using an accessory. A force pulling the film was set to 0.1 N, a first temperature rise process was performed at a temperature of 100 to 350° C. and a temperature rise rate of 5° C./min, cooling was performed at a temperature of 350 to 100° C. and a cooling rate of 5° C./min, and a second temperature rise process was performed again at a temperature of 100 to 400° C. and a temperature rise rate of 5° C./min, to measure a glass transition temperature. In this case, an inflection point appearing in a temperature rise section in the second temperature rise process was a glass transition temperature $T_g$.

Example 1

Terephthaloyl dichloride (TPC) and 2,2'-bis(trifluoromethyl)-benzidine (TFMB) were added to a solution in which dichloromethane and pyridine were mixed with each other in a reactor and stirring was performed under a nitrogen atmosphere at 25° C. for 2 hours. In this case, a molar ratio of TPC:TFMB was set to 300:400, and a solid content was adjusted to 10 wt %. Thereafter, the reactant was precipitated in an excess amount of methanol and then filtered, and the obtained solid content was vacuum-dried at 50° C. for 6 hours or longer to obtain an oligomer. A formula weight (FW) of the produced oligomer was 1,670 g/mol.

N,N-dimethylacetamide (DMAc) as a solvent, 100 moles of the oligomer, and 28.6 moles of 2,2'-bis(trifluoromethyl)-benzidine (TFMB) were injected into the reactor and stirring was sufficiently performed. After confirming that the solid raw material was completely dissolved, fumed silica (surface area: 95 m²/g, <1 μm) was added to DMAc in an amount of 1,000 ppm with respect to the solid content, and the fumed silica was dispersed using ultrasonic waves and then injected into the reactor. 64.3 moles of 1,2,3,4-cyclobutanetetracarboxylic dianhydride (CBDA) and 64.3 moles of 4,4'-hexafluoroisopropylidene diphthalic anhydride (6FDA) were sequentially injected, stirring was sufficiently performed, and then polymerization was performed at 40° C. for 10 hours. At this time, the solid content was 12 wt %. Subsequently, pyridine and acetic anhydride were sequentially added to the solution, respectively, at 2.5-fold moles relative to a total content of the dianhydride, and stirring was performed at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining a polyamide-imide powder. The powder was diluted and dissolved with DMAc at 20 wt % to prepare a polyimide-based resin solution.

The prepared composition for forming a polyimide-based film was coated onto a glass substrate using an applicator, the composition was dried in a vacuum oven at 100° C. for 2 hours and dried at 150° C. for 2 hours and 280° C. for 2 hours, the drying was performed while raising the temperature stepwise in each of the steps at a temperature rise rate of 15° C./min, and the temperature was cooled to room temperature, thereby producing a film.

A content of a residual solvent in the produced film was 1.3 wt %. A glass transition temperature of the produced film was 360° C. and the produced film was subjected to second heat treatment using hot air having a temperature of 330° C. and a humidity of 3.5 wt % for 5 minutes.

In the produced polyamide-imide film, a thickness was 50 μm, a light transmittance at 388 nm was 70%, a total light transmittance was 89.73%, a haze was 0.4%, a yellow index (YI) was 1.9, a b* value was 1.0, a modulus was 6.5 GPa, an elongation at break was 21.2%, a weight average molecular weight was 295,000 g/mol, a polydispersity index (PDI) was 2.21, and a pencil hardness was H/750 g.

In addition, the physical properties and the rates of changes of the physical properties of the produced film are shown in Tables 1 and 2.

Examples 2 and 3

A film was produced in the same manner as that of Example 1, except that the content of the residual solvent and the humidity in the second heat treatment were adjusted as shown in Table 1.

In addition, changes in physical properties of the film subjected to the treatment under a high-temperature and high-humidity condition were measured. The results are shown in Tables 1 and 2.

Example 4

100 moles of 2,2'-bis(trifluoromethyl)-benzidine (TFMB) and 39.6 moles of 1,2,3,4-cyclobutanetetracarboxylic dianhydride (CBDA) were mixed with an N,N-dimethylacetamide (DMAc) solvent in a reactor, and polymerization was performed at 40° C. for 10 hours. 30 moles of terephthaloyl chloride and 30 moles of isophthaloyl chloride were mixed with the reactant so that a solid content of the entire monomers was 10 wt %, and polymerization was performed at 40° C. for 2 hours.

Subsequently, pyridine and acetic anhydride were sequentially added to the solution, respectively, at 2.5-fold moles relative to a total content of the dianhydride, and stirring was performed at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining a polyamide-imide powder. The powder was diluted and dissolved with DMAc at 20 wt %, and 1,000 ppm of fumed silica was added and dispersed, thereby preparing a polyimide-based resin solution. The solution was coated onto a glass substrate using an applicator, the solution was dried in a vacuum oven at 100° C. for 2 hours and dried at 150° C. for 1 hour and 280° C. for 30 minutes, the drying was performed while raising the temperature stepwise in each of the steps at a temperature rise rate of 15° C./min, and the temperature was cooled to room temperature, thereby producing a film.

A process of forming the film was performed under the same conditions as those of Example 1. A content of the solvent in the formed film was 4.8 wt %, a glass transition temperature of the produced film was 340° C., and the film was subjected to heat treatment using hot air having a temperature of 310° C. and a humidity of 3.5 wt % for 10 minutes.

In the produced polyamide-imide film, a thickness was 50 μm, a light transmittance at 388 nm was 73%, a total light transmittance was 88.3%, a haze was 1.0%, a yellow index (YI) was 1.7, a b* value was 1.3, a modulus was 5 GPa, an elongation at break was 18.8%, a weight average molecular weight was 310,000 g/mol, a polydispersity index (PDI) was 2.01, and a pencil hardness was H/750 g.

In addition, changes in physical properties of the film subjected to the treatment under a high-temperature and high-humidity condition were measured. The results are shown in Tables 1 and 2.

Comparative Examples 1 to 4

A film was produced in the same manner as that of Example 1, except that the content of the residual solvent and the humidity in the heat treatment were adjusted as shown in Table 1.

In addition, changes in physical properties of the film subjected to the treatment under a high-temperature and high-humidity condition were measured. The results are shown in Tables 1 and 2.

Comparative Example 5

A film was produced in the same manner as that of Example 1, except that the heat treatment was not performed in Example 1.

In addition, changes in physical properties of the film subjected to the treatment under a high-temperature and high-humidity condition were measured. The results are shown in Tables 1 and 2.

TABLE 1

| Example | Content of residual solvent (wt %) | Humidity in high-temperature heat treatment (%) | Modulus (GPa) | | Rate of change of modulus (%) |
| --- | --- | --- | --- | --- | --- |
| | | | Before high-temperature and high-humidity | After high-temperature and high-humidity | |
| Example 1 | 1.3 | 3.5 | 6.5 | 6.44 | 0.92 |
| Example 2 | 2.0 | 8.3 | 6.3 | 6.15 | 2.38 |
| Example 3 | 4.1 | 9.1 | 5.8 | 5.4 | 6.90 |
| Example 4 | 4.8 | 3.5 | 7.1 | 6.5 | 8.45 |
| Comparative Example 1 | 1.3 | 11.0 | 6.0 | 5.28 | 12.00 |
| Comparative Example 2 | 6.0 | 9.8 | 5.6 | 4.98 | 11.07 |
| Comparative Example 3 | 8.5 | 11.7 | 4.9 | 4.23 | 13.67 |
| Comparative Example 4 | 10.2 | 12.3 | 4.2 | 3.60 | 14.29 |
| Comparative Example 5 | 1.3 | — | 5.7 | 4.6 | 19.30 |

TABLE 2

| Example | Phase difference ($R_{in}/R_{th}$) | | Rate of change of in-plane phase difference ($R_{in}$) (%) | Degree of curl (mm) | | Mura phenomenon |
| --- | --- | --- | --- | --- | --- | --- |
| | Before high-temperature and high-humidity | After high-temperature and high-humidity | | Before high-temperature and high-humidity | After high-temperature and high-humidity | |
| Example 1 | 173/5797 | 169/5739 | 2.31 | 2 | 3 | ○ |
| Example 2 | 177/5802 | 171/5668 | 3.39 | 3 | 4 | ○ |
| Example 3 | 185/5988 | 176/5736 | 4.86 | 4 | 5 | ○ |
| Example 4 | 177/5867 | 169/5776 | 4.52 | 4 | 4 | ○ |
| Comparative Example 1 | 173/6033 | 165/5779 | 4.62 | 5 | 6 | Δ |
| Comparative Example 2 | 400/6324 | 377/6134 | 5.75 | 7 | 8 | Δ |
| Comparative Example 3 | 422/6332 | 396/5952 | 6.50 | 9 | 10 | x |
| Comparative Example 4 | 441/6444 | 413/6096 | 6.35 | 10 | 11 | x |
| Comparative Example 5 | 175/6055 | 166/5883 | 5.14 | 4 | 7 | Δ |

As set forth above, the polyimide-based film according to the present invention may have small changes in the mechanical physical properties and the optical physical properties in a severe condition of high-temperature and high-humidity.

Therefore, the present invention may provide the polyimide-based film having uniform quality even in a high-temperature and high-humidity external environment such as in summer or even in a case where a high-temperature and high-humidity condition is required in a film production process.

Further, the present invention may provide the polyimide-based film having stable optical physical properties because the polyimide-based film has a small change in modulus, is less curled, and has a small change in phase difference characteristics even in a case where water permeates under a severe condition of high-temperature and high-humidity, the window cover film including the polyimide-based film, and the flexible display panel including the polyimide-based film.

Hereinabove, although the present invention has been described by specific matters and exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the spirit of the present invention.

What is claimed is:

1. A polyimide-based film of which a modulus measured according to ASTM D882 is 5 GPa or more and a rate of change of the modulus, after the polyimide-based film is maintained under a high-temperature and high-humidity condition of 60° C. and 90% RH for 500 hours, is 10% or less,
   wherein the polyimide-based film has an elongation at break of 8% or more when measured according to ASTM D882, a light transmittance of 5% or more when measured at 388 nm according to ASTM D1746, a total light transmittance of 87% or more when measured at 400 to 700 nm according to ASTM D1746, a haze of 2.0% or less, a yellow index of 5.0 or less, and a b* value of 2.0 or less, and
   wherein the polyimide-based film is formed from a polyamide-imide-based resin prepared by polymerizing an amine-terminated polyamide oligomer derived from a first fluorine-based aromatic diamine and an aromatic diacid dichloride, with a second fluorine-based aromatic diamine, an aromatic dianhydride, and an alicyclic dianhydride.

2. The polyimide-based film of claim 1, wherein a rate of change of an in-plane phase difference of the polyimide-based film, after the polyimide-based film is maintained under the high-temperature and high-humidity condition of 60° C. and 90% RH for 500 hours, is 5% or less.

3. The polyimide-based film of claim 1, wherein an in-plane phase difference and a phase difference in a thickness direction of the polyimide-based film measured at a wavelength of 550 nm are 200 nm or less and 6,000 nm or less, respectively.

4. The polyimide-based film of claim 1, wherein a thickness of the polyimide-based film is 30 to 100 μm.

5. A window cover film comprising the polyimide-based film of claim 1.

6. The window cover film of claim 5, further comprising one or more coating layers selected from a hard coating layer, an antistatic layer, an anti-fingerprint layer, an antifouling layer, an anti-scratch layer, a low-refractive layer, an anti-reflective layer, and an impact absorption layer, the coating layer being formed on one surface of the polyimide-based film.

7. A flexible display panel comprising the polyimide-based film of claim 1.

8. The polyimide-based film of claim 1, wherein the polyimide-based film is formed of a polyimide-based resin having a block polyamide-imide structure.

9. The polyimide-based film of claim 3, wherein an in-plane phase difference and a phase difference in a thickness direction of the polyimide-based film measured at a wavelength of 550 nm are 173 to 200 nm and 5,797 to 6,000 nm, respectively.

10. The polyimide-based film of claim 1, wherein the polyimide-based film has a yellow index of 1.9.

11. The polyimide-based film of claim 1, wherein the polyimide-based film has a total light transmittance of 89% or more when measured at 400 to 700 nm according to ASTM D1746.

12. A polyimide-based film of which a modulus measured according to ASTM D882 is 5 GPa or more and a rate of change of the modulus, after the polyimide-based film is maintained under a high-temperature and high-humidity condition of 60° C. and 90% RH for 500 hours, is 10% or less, wherein an in-plane phase difference and a phase difference in a thickness direction of the polyimide-based film measured at a wavelength of 550 nm are 173 nm to 200 nm and 5,797 nm to 6,000 nm, respectively, and wherein the polyimide-based film is formed from a polyamide-imide-based resin prepared by polymerizing an amine-terminated polyamide oligomer derived from a first fluorine-based aromatic diamine and an aromatic diacid dichloride, with a second fluorine-based aromatic diamine, an aromatic dianhydride, and an alicyclic dianhydride.

* * * * *